United States Patent
Luecht et al.

(10) Patent No.: US 12,006,152 B2
(45) Date of Patent: Jun. 11, 2024

(54) METHODS AND SYSTEMS FOR MANAGING TEMPORARY STORAGE IN WAREHOUSES

(71) Applicant: ZEBRA TECHNOLOGIES CORPORATION, Lincolnshire, IL (US)

(72) Inventors: Andre Luecht, Odessa, FL (US); Nathan J. Clevenger, Burnsville, MN (US)

(73) Assignee: Zebra Technologies Corporation, Lincolnshire, IL (US)

(*) Notice: Subject to any disclaimer, the term of this patent is extended or adjusted under 35 U.S.C. 154(b) by 721 days.

(21) Appl. No.: 17/156,222

(22) Filed: Jan. 22, 2021

(65) Prior Publication Data
US 2022/0234830 A1    Jul. 28, 2022

(51) Int. Cl.
| | |
|---|---|
| B65G 1/10 | (2006.01) |
| B65G 1/137 | (2006.01) |
| H04W 4/35 | (2018.01) |
| H04W 4/80 | (2018.01) |

(52) U.S. Cl.
CPC ............ *B65G 1/1373* (2013.01); *B65G 1/10* (2013.01); *H04W 4/35* (2018.02); *H04W 4/80* (2018.02)

(58) Field of Classification Search
CPC ...... B65G 1/1373; B65G 1/1371; B65G 1/10; H04W 4/35; H04W 4/80; H04W 4/029; H04W 4/33; G06Q 50/28; G06Q 10/087
See application file for complete search history.

(56) References Cited

U.S. PATENT DOCUMENTS

| | | | |
|---|---|---|---|
| 4,506,798 | A | 3/1985 | Goutille |
| 5,172,121 | A | 12/1992 | Beecher |
| 5,656,996 | A | 8/1997 | Houser |
| 5,920,287 | A | 7/1999 | Belcher et al. |
| 6,026,378 | A | 2/2000 | Onozaki |
| 6,121,926 | A | 9/2000 | Belcher et al. |
| 6,127,938 | A | 10/2000 | Friedman |
| 6,127,976 | A | 10/2000 | Boyd et al. |
| 6,317,082 | B1 | 11/2001 | Bacon et al. |

(Continued)

FOREIGN PATENT DOCUMENTS

| | | |
|---|---|---|
| DE | 4215236 | 11/1993 |
| EP | 1544386 A1 | 6/2005 |

*Primary Examiner* — Patrick H Mackey

(57) ABSTRACT

Methods and systems for managing temporary storage in warehouses are disclosed herein. An example method includes receiving a first electronic notification that items of a shipment are to be stored in temporary locations in a warehouse; in response to the first notification, automatically redirecting location information determined electronically based on asset tags affixed to the items from a warehouse management system to a temporary storage management system as the items are stored in the temporary locations; receiving a second electronic notification that the items are to be moved from the temporary locations to final locations; and in response to the second notification, automatically communicating the redirected location information to enable the warehouse worker to locate the items at the temporary locations based on the redirected location information and store them at the final locations, the final locations identified for the warehouse worker by the warehouse management system.

19 Claims, 8 Drawing Sheets

(56) References Cited

U.S. PATENT DOCUMENTS

| | | |
|---|---|---|
| 6,356,802 B1 | 3/2002 | Takehara et al. |
| 6,370,222 B1 | 4/2002 | Cornick, Jr. |
| 6,380,894 B1 | 4/2002 | Boyd et al. |
| 6,434,194 B1 | 8/2002 | Eisenberg et al. |
| 6,502,005 B1 | 12/2002 | Wrubel et al. |
| 6,535,116 B1 | 3/2003 | Zhou |
| 6,577,921 B1 | 6/2003 | Carson |
| 6,593,885 B2 | 7/2003 | Wisherd et al. |
| 6,655,582 B2 | 12/2003 | Wohl et al. |
| 6,657,586 B2 | 12/2003 | Turner |
| 6,665,582 B1 | 12/2003 | Moritz et al. |
| 6,665,585 B2 | 12/2003 | Kawase |
| 6,812,839 B1 | 11/2004 | Belcher et al. |
| 6,853,687 B2 | 2/2005 | Belcher |
| 6,853,875 B1 | 2/2005 | Moritz et al. |
| 6,859,485 B2 | 2/2005 | Belcher |
| 6,892,054 B2 | 5/2005 | Belcher et al. |
| 6,927,688 B2 | 8/2005 | Tice |
| 6,975,224 B2 | 12/2005 | Galley, III et al. |
| 8,060,400 B2* | 11/2011 | Wellman .......... G06Q 10/06316 235/375 |
| 8,989,053 B1* | 3/2015 | Skaaksrud .............. H04L 67/52 370/255 |
| 9,280,756 B2* | 3/2016 | Hara .................... G06Q 10/087 |
| 9,892,353 B1* | 2/2018 | Lui ........................ H04W 4/029 |
| 9,992,624 B2* | 6/2018 | Sainfort ................ H04W 4/029 |
| 10,618,735 B1* | 4/2020 | Oh ......................... B65G 1/137 |
| 11,170,342 B1* | 11/2021 | Chen .................. G06Q 10/0875 |
| 2002/0070891 A1 | 6/2002 | Huston et al. |
| 2002/0181565 A1 | 12/2002 | Boyd et al. |
| 2003/0137968 A1 | 7/2003 | Lareau et al. |
| 2003/0191555 A1 | 9/2003 | Takehara et al. |
| 2004/0066328 A1 | 4/2004 | Galley, III et al. |
| 2004/0183673 A1 | 9/2004 | Nageli |
| 2004/0249557 A1 | 12/2004 | Harrington et al. |
| 2004/0263329 A1 | 12/2004 | Cargonja et al. |
| 2005/0099305 A1 | 5/2005 | Maloney |
| 2006/0006228 A1 | 1/2006 | Poulter |
| 2006/0087431 A1 | 4/2006 | Shieh et al. |
| 2006/0255950 A1 | 11/2006 | Roeder et al. |
| 2007/0008107 A1 | 1/2007 | Farrell et al. |
| 2016/0364681 A1* | 12/2016 | Andrus ............... G06Q 10/087 |
| 2018/0247257 A1* | 8/2018 | Lert, Jr. ................. G06Q 10/08 |
| 2022/0253804 A1* | 8/2022 | Lively ............ G06Q 10/08355 |

\* cited by examiner

METHODS AND SYSTEMS FOR MANAGING TEMPORARY STORAGE IN WAREHOUSES

BACKGROUND

Congestion scenarios are common in warehouses. For example, for inbound shipments, congestion may occur because of insufficient planning, arrival delays impacting slot management, processing or unloading delays in the warehouse, etc. Root causes may include, for example, insufficient staffing, equipment failure, planning failure, and/or unforeseen traffic conditions. Real time events may render predetermined schedules obsolete and/or require an override or a reprioritization of tasks. Not all inbound loads arrive with the same priority. A low priority load that arrived on time may block dock, worker, equipment, etc. needed for a high priority load that arrived delayed.

For outbound shipments, time-sensitive shipping vehicle (e.g., truck, ship, train, etc.) departures and/or live loading environments require the pre-collecting of items (e.g., pre-building of pallets). The most labor intensive and, thereby, most expensive tasks are centered on building case-picked mixed pallets of varying case structures and/or dimensions. Cross-dock operations, distribution center (DC), third-party logistics (3PL) and/or less than a truck load (LTL) providers face more challenging environments than manufacturers and/or consumer packaged goods (CPG) shippers with uniform items and pallet loads. High throughput locations, seasonal peaks, and/or structurally limited warehouses without dedicated available staging space may make load staging difficult. The structural integrity of a wrapped pallet determines whether double-stacking in a trailer is possible and, more generally, affects load safety. Work-in-progress for building pallets and staging a load takes away space in the warehouse. For example, a single stacked staged load covers as much floor space as the footprint of the trailer to be used. In an environment that is space-constraint (e.g., a warehouse, distribution center, etc.), staging a load and waiting for a truck to arrive to be loaded is highly inefficient. However, not preparing and staging a load is not a viable option either. It could lead to delays in building the load, waiting time for the driver, dwell time for the trailer and subsequent departure and/or cut-off misses. Many transport recipients will levy a fine on delayed arrivals and/or incomplete loads. Financial penalties, customer service failures, and/or adverse transportation network impacts are the result.

Today, the system of record (e.g., a warehouse management system (WMS), enterprise resource planning (ERP) system, etc.) is the main sequencing and planning tool for a warehouse. However, many such systems do not support unplanned exception case adjustments, unplanned temporary suspensions of WMS driven task schedules, and/or unplanned reallocations of material handling equipment (e.g., forklifts, pallet jacks, pallet lift, etc.), worker, etc. Thus, there is a need for methods and systems for managing temporary storage in warehouses.

SUMMARY

In an embodiment, a method for managing temporary storage in a warehouse having an electronic locationing system includes: receiving, at a temporary storage management system, a first electronic notification that an item of a shipment is to be stored in a temporary location in a warehouse; in response to the first electronic notification, automatically redirecting location information for an asset tag affixed to the item from a warehouse management system to the temporary storage management system as the item is moved to the temporary location, wherein the location information is determined electronically by an electronic locationing system based on the asset tag affixed to the item; receiving, at the temporary storage management system, a second electronic notification that the item is to be moved from the temporary location to a final location; in response to the second notification, automatically communicating, from the temporary storage management system to a warehouse worker, the temporary location of the item determined based on the location information for the asset tag to enable the warehouse worker to locate the item at the temporary location and to move the item to a final location, the final location identified for the warehouse worker by the warehouse management system; and ceasing the redirecting of the location information for the asset tag to the temporary storage management system, wherein the warehouse management system comprises a first application, and the temporary storage management system comprises a second application different from the first application.

In another embodiment, a system for managing temporary storage in a warehouse having an electronic locationing system includes: an array of locationing devices configured to electronically determine location information for an item in a warehouse; a warehouse management system to direct the storage of the items at a managed location in the warehouse; one or more electronic devices configured to enable one or more warehouse workers to interact with the warehouse management system for storage of the item at the managed location in the warehouse; and a temporary storage management system configured to: receive a first electronic notification from a first warehouse worker via a first electronic device that an item of a shipment is to be stored at a temporary location in the warehouse; in response to the first notification, cause the electronic locationing system to automatically redirect location information for the item from the warehouse management system to the temporary storage management system; receive a second electronic notification from a second warehouse worker via a second electronic device that the item is to be stored at a final location; and in response to the second notification, automatically communicate the temporary location to the second warehouse worker via the second electronic device to enable the second warehouse worker to locate the item at the temporary location and move the item to a final location, the final location identified for the second warehouse worker by the warehouse management system via the second electronic device.

In another embodiment, a non-transitory machine-readable medium stores instructions that, when executed by one or more processors, causes a system to: receive a first electronic notification that an item of a shipment is to be stored in a temporary location in a warehouse; in response to the first electronic notification, automatically cause an electronic locationing system to redirect location information determined electronically based on an asset tag affixed to the item from a warehouse management system to a temporary storage management system as the is moved to the temporary location; receive a second electronic notification that the item is to be moved from the temporary location to a final location; and in response to the second notification, automatically communicate the temporary location to a warehouse worker to enable the warehouse worker to locate the item at the temporary location and move the item to a the final location, the final location identified for the warehouse worker by the warehouse management system.

In another embodiment, an electronic device includes: a display to present a first user interface for a temporary storage management system, and a second user interface for a warehouse management system; an input device to receive a first notification from a warehouse worker that an item of a shipment is to be stored in a temporary location in a warehouse, and receive a second notification from the warehouse worker that the item is to be stored in a final location in the warehouse; a network interface; a processor; and a memory storing instructions that, when executed by the processor, cause the electronic device to: in response to the first notification, notify, via the network interface, the temporary storage management system that the item will be stored in the temporary location; in response to the second notification, notify, via the network interface, the temporary storage management system that the items will be stored in a final location; receive, via the network interface, from the temporary storage management system first information regarding the temporary location; present the first information in the first user interface; receive, via the network interface, from the warehouse management system second information regarding the final location; and present the second information in the second user interface.

In another embodiment, a non-transitory machine-readable medium stores instructions that, when executed by one or more processors, causes a system to: display a first user interface for a temporary storage management system; display a second user interface for a warehouse management system; receive, via the first user interface, a first notification from a warehouse worker that an item of a shipment is to be stored in temporary location in a warehouse; in response to the first notification, notify, via a network interface, a temporary storage management system that the item will be stored in the temporary location; receive, via the first user interface, a second notification from the warehouse worker that the item is to be stored in a final location in the warehouse; in response to the second notification, notify, via the network interface, the temporary storage management system that the item will be stored in the final location; receive from the temporary storage management system first information regarding the temporary location; present the first information in the first user interface; receive from the warehouse management system second information regarding the final location; and present the second information in the second user interface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
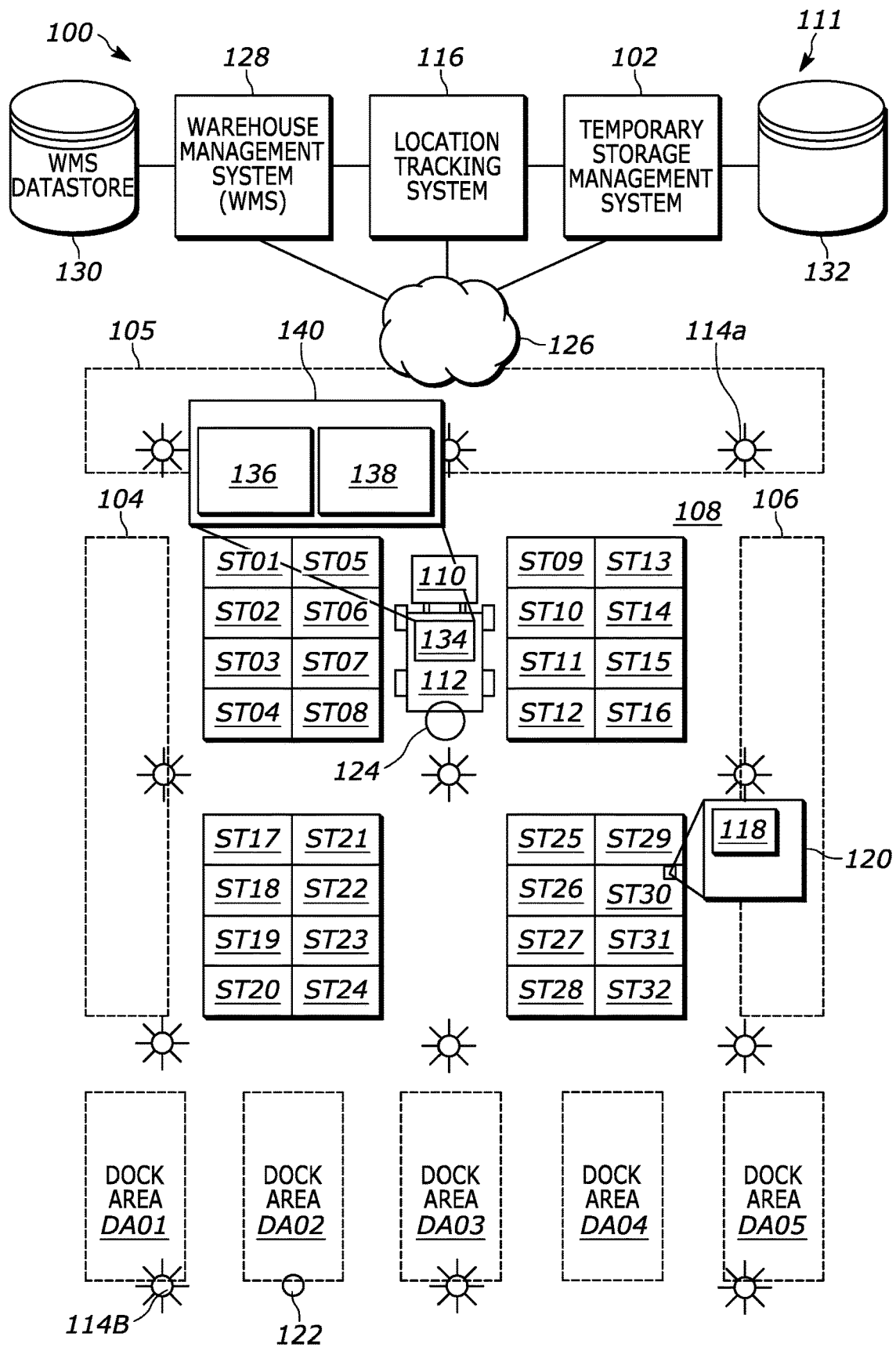
FIG. 1 illustrates an example warehouse having an example temporary storage management system, in accordance with aspects of this disclosure, for managing temporary storage in the warehouse.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

For inbound, incoming, arriving, etc. shipments, when a low-priority shipment blocks a higher-priority shipment, disclosed methods and systems for managing temporary storage in warehouses enable, among other things, still to be unloaded physical items (e.g., pallets, crates, boxes, articles of manufacture, goods, etc.) of the low-priority shipment to be quickly, randomly, opportunistically, etc. placed, dropped off, etc. by one or more workers anywhere there is available, convenient space in a warehouse to allow for rapid, urgent, faster, etc. unloading. Unloaded items need not be placed together at the same temporary location(s). Because any convenient, available, nearby, etc. space may be used, WMS proposed, managed, or planned storage locations may be temporarily ignored in examples disclosed herein, thereby eliminating the time required for workers to find WMS defined storage location(s). Because, in examples disclosed herein, the opportunistic, temporary drop off locations are separately and automatically recorded in real time by a temporary storage management system using automated location tracking, the WMS need not be aware of the temporary drop off locations. A task override, exception, etc. of the WMS directing additional workers and/or additional material handling equipment to a thus prioritized unload may be used to further increase unloading speed. Once the unloading bottleneck has been removed and the higher-priority load has docked at the previously occupied dock, the additionally allocated worker(s) and/or equipment may be disengaged and/or reverted to their original sequence of tasks. The rapidly unloaded low-priority items can be retrieved by the workers, when convenient, from their random, opportunistic, temporary, etc. drop-off location(s) based on the locations automatically recorded by the temporary storage management system and placed at their WMS proposed, managed, planned, final, etc. storage locations, allowing for return to standard operating procedures. The retrieval and replacement can be performed at once or over time as staffing, material moving equipment, etc. is available.

For outbound, outgoing, departing, etc. shipments, disclosed methods and systems for managing temporary storage in warehouses enable, among other things, partial loads of items (e.g., pallets, crates, boxes, articles of manufacture, goods, etc.) to be collected, built, stored, etc. wherever space is available without blocking a staging area, thereby, saving space. Additionally, because a load may be incrementally built using the examples disclosed herein, load building may be accelerating by taking advantage of time increments otherwise unsuitable for other, larger tasks. Using disclosed examples, it is no longer necessary for workers to build and/or store all of a full load at once in the same place. Incremental free spaces and/or incremental free time slots in work schedules may be used prepare the load. The need for dedicated staging areas and/or dedicated staging per dock may be reduced and/or eliminated altogether. The need for dedicated time slots or work packages in a warehouse worker's schedule can be reduced and/or smaller increments of otherwise idle time can be used for productive purposes. Once the outbound shipping vehicle (e.g., truck, trailer, ship, train, etc.) arrives, portions of the outbound load that were built over time in increments (e.g., partial loads) can be retrieved by workers from their multiple opportunistic, temporary storage location(s), as recorded in a temporary storage management system, and loaded onto the truck.

FIG. 1 is a block diagram representative of an example warehouse 100 having an example temporary storage management system 102, in accordance with aspects of this disclosure, for managing temporary storage in the warehouse 100. The temporary storage management system 102 is configured to, among other things, handle inbound exceptions and/or outbound shipment staging. The example warehouse 100 generally includes any number and/or type(s) of storage positions ST01-ST32 (e.g., shelfs, racks, bins, etc.) configured to store any number and/or type(s) physical items (e.g., pallets, crates, boxes, articles of manufacture, goods, containers, cartons, etc.) in their managed final storage position(s), any number and/or type(s) of unallocated areas 104-106 that may be used for placement of physical items prior to put-away in their managed final storage position(s) ST01-ST32, and any number and/or type(s) dock areas DA01-DA05. The storage positions ST01-ST32, the unallocated areas 104-106, and the dock areas DA01-DA05 may be separated by any number and/or type(s) of pathways, walkways, corridors, etc. (one of which is designated at reference numeral 108) for moving items (one of which is designated at reference numeral 110) between the storage positions ST01-ST32, the unallocated areas 104-106, and the dock areas DA01-DA05 with, for example, material moving equipment such as a forklift 112, a pallet jack, a pallet lift, cart, etc.

While the illustrated example of FIG. 1 shows the storage positions ST01-ST32, the unallocated areas 104-106, the dock areas DA01-DA05, and the pathways 108 in an example arrangement and having example relative dimensions, the storage positions ST01-ST32, the unallocated areas 104-106, the dock areas DA01-DA05, and the pathways 108 may be combined, divided, rearranged, omitted, eliminated, arranged and/or implemented in any other way. Further, the example warehouse 100 of FIG. 1 may include one or more storage positions, unallocated areas, dock areas, pathways, office or personnel areas, etc. in addition to, or instead of, those illustrated in FIG. 1, and/or may include more than one of any or all of the illustrated storage positions, unallocated areas, dock areas and/or pathways. Moreover, while for clarity of discussion, example methods and apparatus for managing temporary storage are disclosed herein with reference to the warehouse 100, the example methods and apparatus disclosed herein may be used to manage temporary storage in any number of facilities, buildings, areas, rooms, etc. configured for receiving, storing, shipping, conveying, transporting, etc. any number and/or type(s) of physical items.

To determine the real time locations of physical items (e.g., the item 110) throughout the warehouse 100, the example warehouse includes an electronic locationing system 111 having an example array of locationing devices (two of which are designated at reference numeral 114A and 114B) each having one or more transmitters and/or receivers, and an example location tracking system 116. The array of locationing devices 114A, B and the location tracking system 116 and/or, more generally the electronic locationing system 111 sense the location of asset tags (one of which is designated at reference numeral 118) attached to each item (two of which are designated at reference numerals 110 and 120) in the warehouse 100. Additionally and/or alternatively, the warehouse 100 may include readers (one of which is designated at reference numeral 122) at, for example, dock doors and/or other transition points for reading nearby asset tags. Readers may, additionally and/or alternatively, be worn, carried, affixed to material moving equipment (one of which is designated at reference numeral 124 affixed to the forklift 112), etc. In general, the locationing devices 114A, B are arranged within the warehouse 100 to provide an ability to read asset tags throughout the extent of the warehouse 100 in which items may be present and/or at points of interest. The locationing devices 114A, B and the readers 122, 124 communicate with the location tracking system 116 via one or more of any type(s) of network(s) 126. In some examples, the readers 122, 124 are locationing devices. In some examples, the readers 122, 124 simply read, access, etc. nearby tags without identifying their locations. In such examples, the location of an asset tag may be associated with that of a reader 122, 124.

In some examples, the asset tags 118 are passive, ultra-high frequency (UHF), radio frequency identification (RFID) tags that can be read by the location tracking system 116, the array of locationing devices 114A, B and/or the readers 122, 124. In some examples, the location tracking system 116 and the array of locationing devices 114A, B use beam steering to electronically steer and process hundreds of simultaneous narrow RFID beams (e.g., flashlight-style beams) to simultaneously read hundreds of asset tags 118. The location tracking system 116 and the array of locationing devices 114A, B may determine the location of asset tags 118 to, for example, within two feet (i.e., 0.6 meters). By using wide, angle multi-polarization antennas, the array of locationing devices 114A, B may implement dual circular and/or linear coverage patterns to improve asset tag readability in different environments and applications.

The location tracking system 116 may collect asset tag bearing data (e.g., data representing the directions from locationing devices 114A, B to asset tags) from the array of locationing devices 114A, B and/or the readers 122, 124, triangulate the asset tag bearing data to triangulate the locations of the asset tags 118, and stream the triangulated locations of the asset tags 118 to, for example, a business system such as an example warehouse management system (WMS) 128 and, additionally and/or alternatively, to the temporary storage management system 102.

While an example electronic locationing system 111 having an arrangement of the array of locationing devices 114A, B and the readers 122, 124 is shown in FIG. 1, the array of locationing devices 114A, B and the readers 122, 124 may be combined, divided, rearranged, omitted, eliminated, arranged and/or implemented in any other way. Further, the example electronic locationing system 111 and/or, more generally, the warehouse 100 of FIG. 1 may include one or more locationing devices, readers, etc. in addition to, or instead of, those illustrated in FIG. 1 and/or disclosed herein.

Generally speaking, the WMS 128 may be implemented by one or more software applications or modules executing on one or more servers. The WMS 128 supports and optimizes warehouse and/or distribution center functionality and/or management. The WMS 128 may facilitate management of the warehouse 100 in their daily planning, organizing, staffing, directing, and controlling the utilization of available resources, to move and/or store materials into, within, and/or out of the warehouse 100, while supporting worker in the performance of material movement and/or storage in and around the warehouse 100. Among other data, the WMS 128 may store, for each item, its current location (e.g., as determined in real time by the locationing devices 114, the location tracking system 116 and/or the readers 122, 124) and its intended location in an example WMS datastore 130. In some examples disclosed herein, the management of temporary storage by the temporary storage management system 102 can be performed without modification of whatever business system(s) (e.g., the WMS 128) are deployed in the warehouse 100. That is, the functionality of the temporary storage management system 102 can be implemented alongside, additional to, and/or on top of that implemented by the WMS 128 and may be implemented without modification of the WMS 128. Moreover, because WMSs rely on rules to define specific sequences of item movement and designated storage positions, the temporary storage management system 102 and electronic locationing system 111 implement functionality that is not supportable and/or contemplated by WMSs. In particular, the random, opportunistic movements, storage and retrieval of items provided by disclosed examples is contrary to the working principles of WMSs. Further, the (near) real time aspects of the disclosed examples is not supportable by WMSs, which utilize much slower refresh rates regarding the locations of items. Thus, if a WMS were used to track temporary, random storage of an item (which it cannot do), a worker would have to delay to a next refresh interval (e.g., half a day) before the WMS would be able to identify the location of the temporarily stored item, which could cause major interruptions to the flow of goods in a warehouse. The WMS 128, the temporary storage management system 102, and the location tracking system 116 may each be implemented by one or more of an application, system and/or module for execution on one or more servers, systems, computers or other machines. In some examples, the WMS 128 and the temporary storage management system 102 are implemented by separate, non-communicatively-coupled applications, not modules of a same application. In some examples, the WMS 128 and the temporary storage management system 102 are implemented by separate, non-communicatively-coupled modules of a server, system and/or application.

Figure 2:
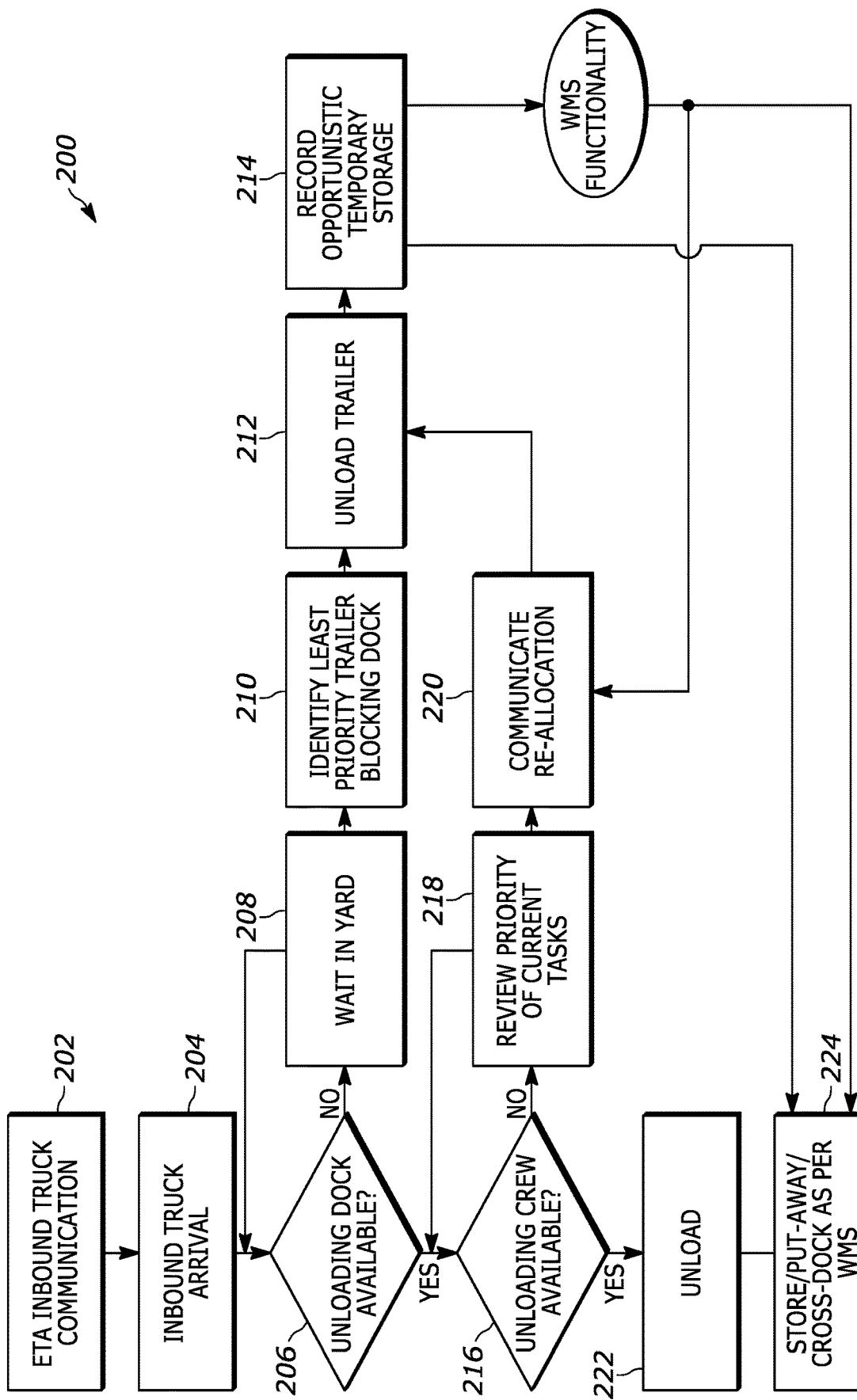
FIG. 2 is a flowchart of an example use case of the example temporary storage management system and/or, more generally, the example warehouse of FIG. 1.

FIG. 2 is a flowchart 200 illustrating an example use case 200 of the temporary storage management system 102 and/or, more generally, the warehouse 100, in accordance with aspects of this disclosure, for managing temporary storage in warehouses to handle inbound exceptions. The example use case 200 of FIG. 2 begins with the notification, e.g., from a dispatcher or dispatch system (block 202) and arrival (block 204) of a high-priority inbound truck. While an unloading dock (e.g., one of the dock areas DA01-DA05) is not available (block 206), the just arrived high-priority truck waits in, for example, a yard of the warehouse 100 (block 208).

While the high-priority truck waits in the yard (block 208), a lower priority (e.g., lowest priority) docked trailer blocking the just arrived high-priority truck from docking is identified (block 210). The priority of a truck, trailer, load, etc. may be determined using any number and/or type(s) of basis, criteria, system(s), etc. If such a truck is identified (block 210), a warehouse worker notifies the temporary storage management system 102 of the need to rapidly, urgently, etc. unload the identified trailer. In response to the notification, the temporary storage management system 102 configures the location tracking system 116 to start redirecting location information for identified asset tags of items being rapidly unloaded from the identified trailer as temporary location information from the WMS 128 to the temporary storage management system 102. In some disclosed examples, redirecting location information refers to, upon receipt of the location information, sending, forwarding, directing, etc. location information to the temporary storage management system 102 rather than to the WMS 128, as is normally done. Thus, the WMS 128 does not receive the redirected location information. The redirecting may be performed based on, for example, a table that identifies the asset tags for which their location data is to be forwarded, redirected, sent, etc. to the temporary storage management system 102. Thus, redirecting may be performed without having to analyze, review, etc. the content of the location information. That is, location information may be forwarded without consideration to the content of the location information itself, beyond comparing the associated asset tag(s) with the table. However, redirecting location information may be performed in other ways.

As items are rapidly unloaded from the identified trailer and placed in any available, opportunistic location in the warehouse 100 at block 212, the temporary storage management system 102 maintains the temporary location information as a record of where those urgently unloaded items were opportunistically placed at block 212 in a datastore 132 (block 214). Example temporary locations include, but are not limited to, any available ones and/or portions of any available ones of the storage areas ST01-ST32, the unallocated areas 104-106, the pathways 108, etc. Such temporary locations need not be locations managed by the WMS 128. To improve unload speed, locations close to the identified truck are preferably selected and used.

Once the identified trailer is unloaded (block 212), it can be undocked, thereby allowing the waiting high-priority truck to dock (block 206). While an unloading crew for the high-priority just docked truck is not available (block 216), the WMS 128 may review the priority of other ongoing tasks (block 218) and reallocate resources (block 220) to unload the high-priority truck (block 222). In some instances, additional resource assigned to rapidly unload the identified trailer at block 212 can be reallocated (block 220) to unload the just docked high-priority truck (block 222). Once an unloading crew is available (block 216), the now docked high-priority truck can be unloaded (block 222).

Once the high-priority truck is unloaded (block 222), the items that were rapidly unloaded from the identified trailer and placed in any opportunistic, temporary location in the warehouse at block 212 may be stored, put-away, cross-docked based upon final storage location information (e.g., information designating one or more of the storage positions ST01-ST32, a managed staging area, etc.) provided by the WMS 128 (block 224). For example, as the asset tags of those rapidly unloaded items are identified (e.g., by scanning asset tags using one of the readers 122, 124, selecting in a user interface, etc.), the WMS 128 can provide the final storage location information as if the items were being newly unloaded from the identified trailer. In some examples, the temporary storage management system 102 can provide information from the datastore 132 to assist warehouse works in the location and retrieval of the items that were rapidly unloaded and placed in any available, opportunistic location in the warehouse at block 212.

Figure 3:
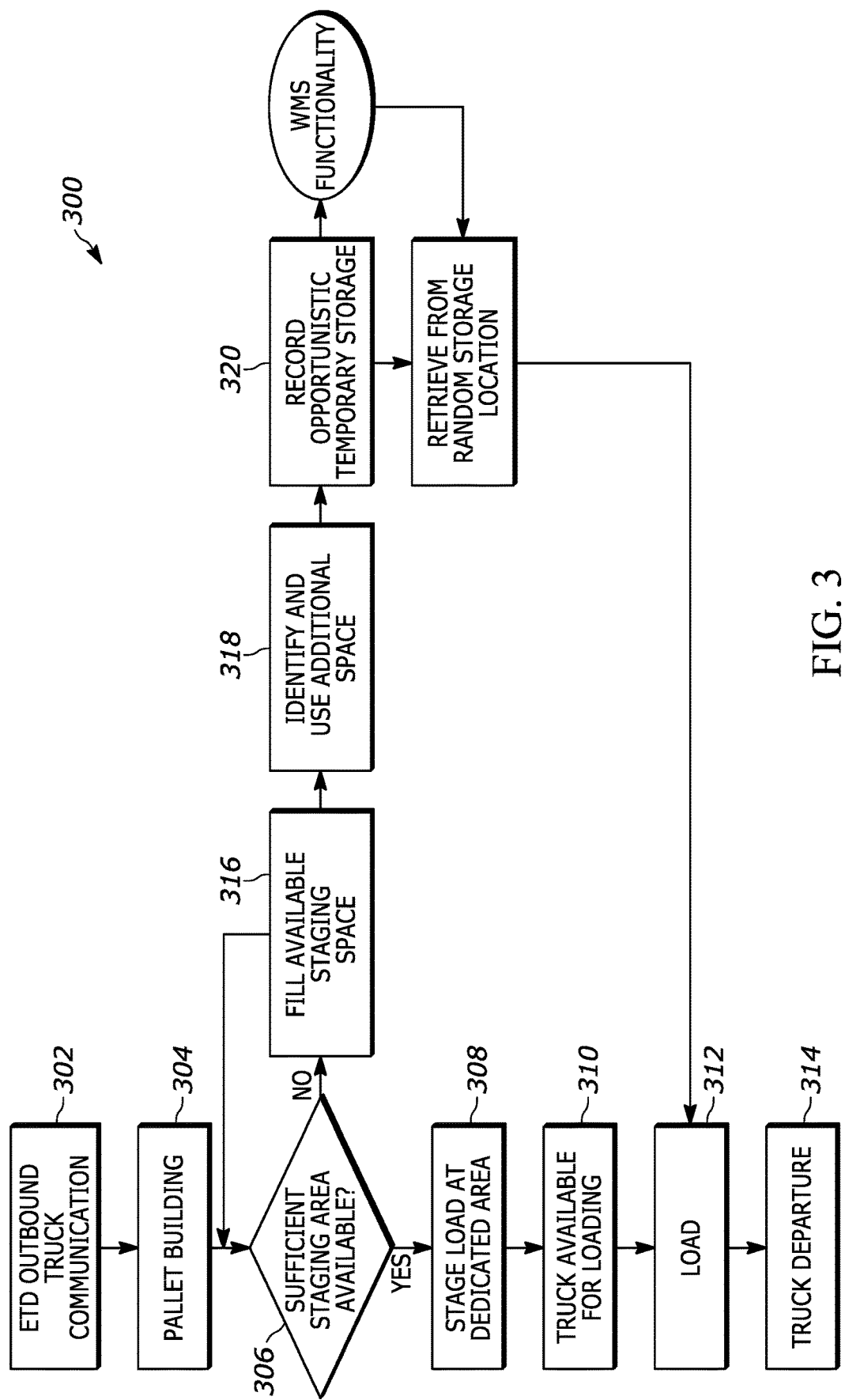
FIG. 3 is a flowchart of another example use case of the example temporary storage management system and/or, more generally, the example warehouse of FIG. 1.

FIG. 3 is a flowchart 300 illustrating another example use case 300 of the temporary storage management system 102 and/or, more generally, the warehouse 100, in accordance with aspects of this disclosure, for managing temporary storage in the warehouse 100 to handle outbound shipment staging. The example use case 300 of FIG. 3 begins with the notification of an inbound truck (block 302). Either in response to the notification or a previous notification, the building of a shipment, load, etc. for the inbound truck begins (block 304). If there is sufficient managed staging area (block 306), the load is staged in the staging area (block 308) and, when the truck is docked (block 310), the truck is loaded from the staging area (block 312) and departs (block 314).

Returning to block 306, if there is not a sufficiently large, single staging area available for the load for the outbound load, shipment, etc. (block 306), any available managed staging area is used (block 316). When no more staging area is available (block 316), a warehouse worker notifies the temporary storage management system 102 that the load will be prepared using opportunistic, temporary storage. In response to the notification, the temporary storage management system 102 configures the location tracking system 116 to start redirecting location information for identified asset tags of items (e.g., built pallets) for the load from the WMS 128 to the temporary storage management system 102 as temporary location information. Opportunistic locations in the warehouse 100 for the items for the load are identified and used (block 318). As items are placed in any opportunistic location in the warehouse (block 318), the temporary storage management system 102 maintains the temporary location information as a record of where those items were opportunistically placed (block 318) in the datastore 132 (block 320). Example temporary locations include, but are not limited to, any available ones and/or portions of any available ones of the storage areas ST01-ST32, the unallocated areas 104-106, the pathways 108, etc. Such temporary locations need not be locations managed by the WMS 128. To improve loading speed, locations close to the dock area(s) that may be used for the outbound truck are preferably selected and used.

When all items of the outbound load have been opportunistically, temporary stored (block 318), and the truck is docked (block 310), the items from the managed staging area(s) and/or that were placed in one or more opportunistic locations in the warehouse at block 212 can be retrieved and loaded on to the outbound truck based upon final storage location information provided by the WMS 128 (block 312). For example, as the asset tags of those items are identified, the WMS 128 can provide the final storage location information within the outbound truck as if the items were being loaded from a staging area or storage position ST01-ST32 managed by the WMS 128. In some examples, the temporary storage management system 102 may provide information from the datastore 132 to assist warehouse workers in the location and retrieval of the items that were temporarily stored in any available, opportunistic location in the warehouse at block 318. Once loaded (block 312), the outbound truck may depart (block 314).

Returning to FIG. 1, in some examples, a warehouse worker can use an example user electronic device 134 to control, manage, use, etc. the temporary storage management system 102 to temporarily store items in the warehouse 100. The user electronic device 134 may display two graphical user interfaces (GUIs) 136 and 138 for the WMS 128 and the temporary storage management system 102, respectively, on a display device 140. In some examples, the GUI 138 for the temporary storage management system 102 may be used to start the use of temporary storage, and to start the recording of temporary storage location information by the temporary storage management system 102. Likewise, the GUI 138 for the temporary storage management system 102 may be used to end the use of temporary storage, and to start the retrieval of temporary location information for opportunistic storage recorded by the temporary storage management system 102.

The GUI 136 for the WMS 128, which may be displayed alongside, instead of, etc. the GUI 138, may be used to retrieve final storage location information from the WMS 128 for items that are being retrieved from temporary opportunistic storage and placed in their final, WMS managed locations.

Figure 4:
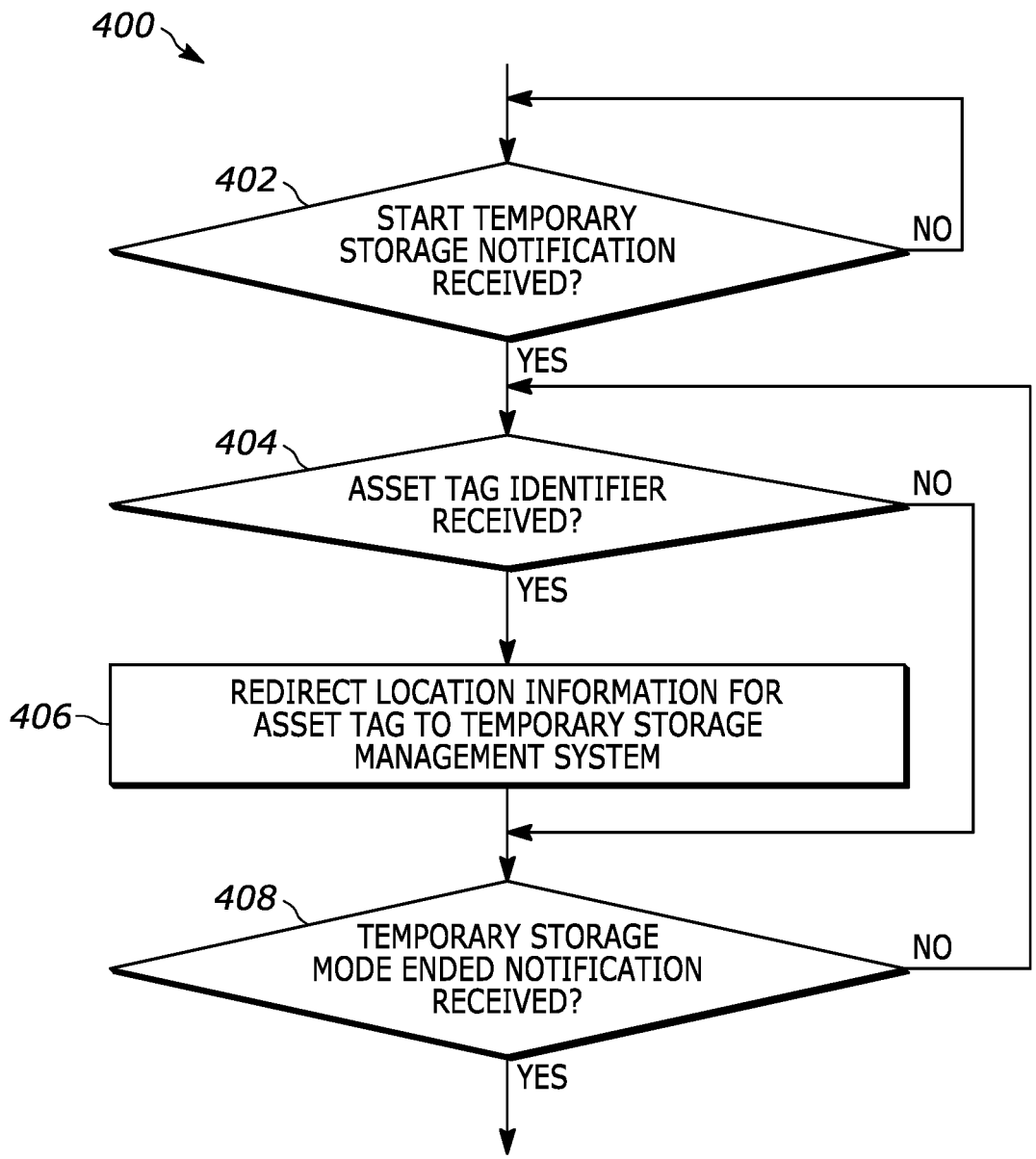
FIG. 4 is a flowchart representative of an example method, hardware logic or machine-readable instructions for implementing the example temporary storage management system of FIG. 1.

FIG. 4 is a flowchart 400 representative of an example method, hardware logic or machine-readable instructions for implementing the temporary storage management system 102 of FIG. 1, in accordance with disclosed embodiments. The processes, methods, software and instructions may be an executable program or portion of an executable program for execution by a processor such as the processor 802 of FIG. 8. The program may be embodied in software or instructions stored on a non-transitory machine-readable storage medium such as a compact disc (CD), a hard disk drive (HDD), a digital versatile disk (DVD), a Blu-ray disk, a cache, a flash memory, a read-only memory (ROM), a random access memory (RAM), or any other storage device or storage disk associated with the processor 802 in which information is stored for any duration (e.g., for extended time periods, permanently, for brief instances, for temporarily buffering, and/or for caching of the information). Further, although the example program is described with reference to the flowchart 400 illustrated in FIG. 4, many other methods of implementing the temporary storage management system 102 may alternatively be used. For example, the order of execution of the blocks may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), an application specific integrated circuit (ASIC), a programmable logic device (PLD), a field programmable gate array (FPGA), a field programmable logic device (FPLD), a logic circuit, etc.) structured to perform the corresponding operation without executing software or instructions.

The example flowchart 400 of FIG. 4 begins with the temporary storage management system 102 waiting to receive a notification that opportunistic, temporary storage of items, inbound or outbound, is to begin (block 402). That is, that items are going to be stored in opportunistic, temporary locations. The notification may be received from, for example, the electronic device 134 (e.g., via the GUI 138 associated with the temporary storage management system 102). When the notification is received (block 402), the temporary storage management system 102 checks for receipt of an asset tag identifier for an item to be temporarily stored (block 404). The asset tag may be identified by the reader 124, via the electronic device 134, a wearable reader, etc. If an asset tag identifier was received, the temporary storage management system 102 configures the location tracking system 116 to redirect real time location information for the identified asset tag from the WMS 128 to the temporary storage management system 102 as temporary location information (block 406). The temporary storage management system 102 stores redirected temporary location information in the datastore 132.

The temporary storage management system 102 determines whether a notification that the temporary storage of items is to end has been received (block 408). If the notification was received (block 408), control exits from the flowchart 400. Otherwise, control returns to block 404 to check for receipt of another asset tag identifier.

Returning to block 404, if an asset tag identifier was not received (block 404), control proceeds to block 408 to determine whether a notification that temporary storage of items was ended has been received (block 408).

Figure 5:
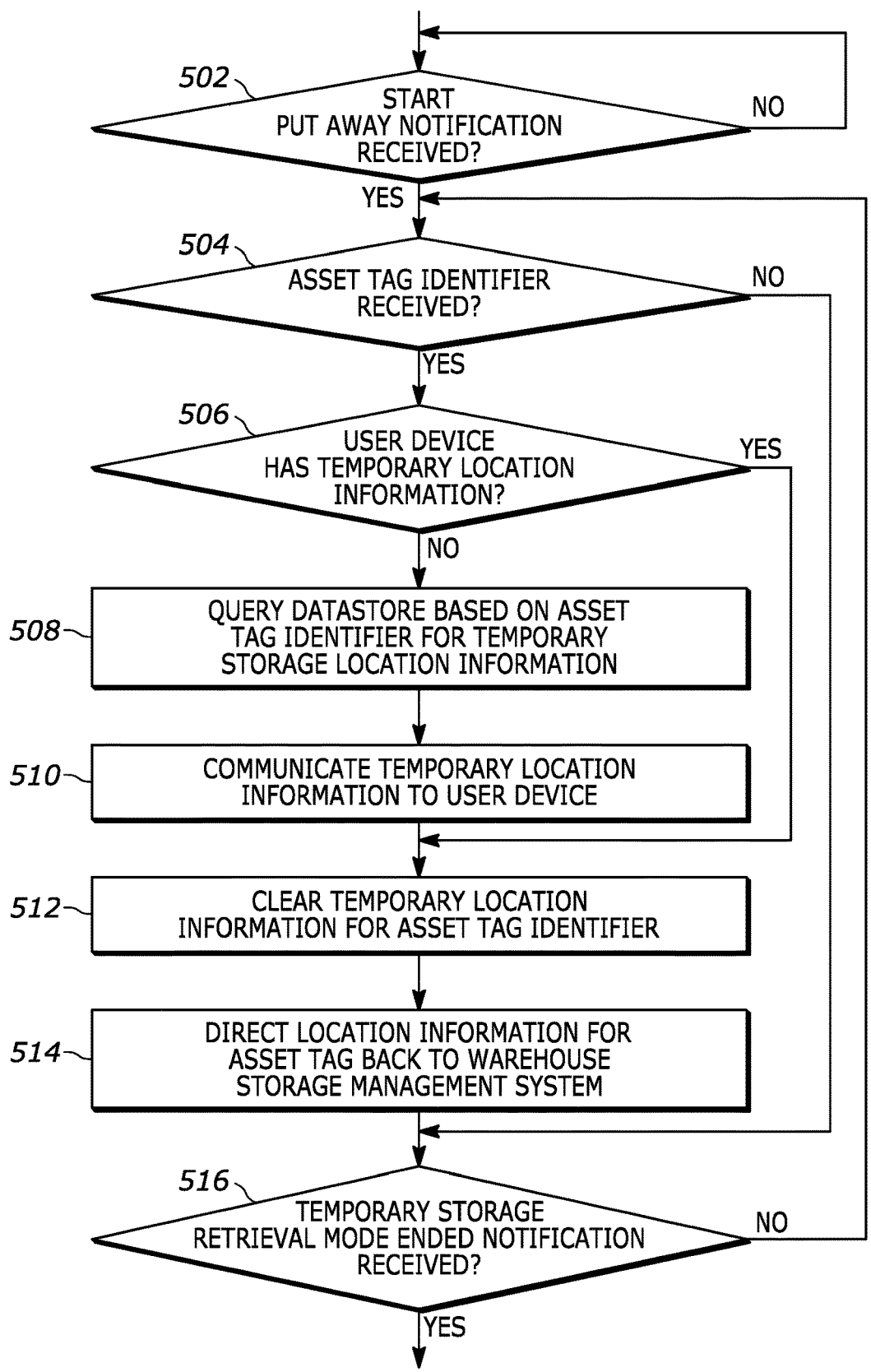
FIG. 5 is a flowchart representative of another example method, hardware logic or machine-readable instructions for implementing the example temporary storage management system of FIG. 1.

FIG. 5 is a flowchart 500 representative of another example method, hardware logic or machine-readable instructions for implementing the temporary storage management system of FIG. 1, in accordance with disclosed embodiments. The machine-readable instructions may be an executable program or portion of an executable program for execution by a computer processor such as the processor 802 shown in the processor platform 800 discussed below in connection with FIG. 8. The program may be embodied in software stored on a non-transitory computer-readable storage medium such as a CD, a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example program is described with reference to the flowchart 500 illustrated in FIG. 5, many other methods of implementing the temporary storage management system 102 may alternatively be used. For example, the order of execution of the blocks may be changed, and/or some of the blocks described may be changed, eliminated, or combined. Additionally, and/or alternatively, any or all of the blocks may be implemented by one or more of a hardware circuit (e.g., discrete and/or integrated analog and/or digital circuitry), an FPGA, an ASIC, a PLD, an FPLD, a comparator, an operational-amplifier (op-amp), a logic circuit, etc.) structured to perform the corresponding operation without executing software or firmware.

The example flowchart 500 of FIG. 5 begins with the temporary storage management system 102 waiting to receive a notification that retrieval and final storage of temporarily stored items, inbound or outbound, is to begin (block 502). That is, that items that are currently stored in one or more temporary locations are to be moved to their final location(s). The notification may be received from, for example, the electronic device 134 (e.g., via the GUI 138 associated with the temporary storage management system 102). When the notification is received (block 502), the temporary storage management system 102 checks for receipt of an asset tag identifier for an item to be finally stored (block 504). If an asset tag identifier was received, the temporary storage management system 102 determines whether a worker already knows the location of the identified asset tag (block 506). For example, if the asset tag was identified by scanning the asset tag, then it may be assumed that the location of the asset tag is known. However, if the item was identified via, for example, the GUI 138, then it may be assumed that the location of the asset tag may not be known.

If the location of the identified asset tag is not known (block 506), then the temporary storage management system 102 queries the datastore 132 based on the received asset tag identifier for the opportunistic, temporary location information for the identified asset tag (block 508) and communicates the current, temporary location of the identified asset tag, and the item to which it is affixed, to the GUI 138 (block 510).

The temporary storage management system 102 may clear the location information from the datastore 132 (block 512), and configures the location tracking system 116 to stop, cease, etc. redirecting location information for the identified asset tag from the WMS 128 to the temporary storage management system 102 (block 514). In some examples, the configuring of the location tracking system 116 to cease redirecting the location information is in response to the notification, another notification (e.g., a worker acknowledging receipt of the current, temporary location), and/or after communicating the current, temporary location.

The temporary storage management system 102 determines whether a notification that retrieval and final storage of temporarily stored items is to end has been received (block 516). That is, the moving of items currently stored in temporary location to their final location(s) is to end. If the notification was received (block 516), control exits from the flowchart 500. Otherwise, control returns to block 504 to check for receipt of another asset tag identifier.

Returning to block 506, if the location of the identified asset tag is known (block 506), then control proceeds to block 512 without querying and/or providing location information.

Returning to block 504, if an asset tag identifier was not received (block 504), control proceeds to block 516 to determine whether a notification that retrieval and final storage of temporarily stored items was end has been received (block 516).

Figure 6:
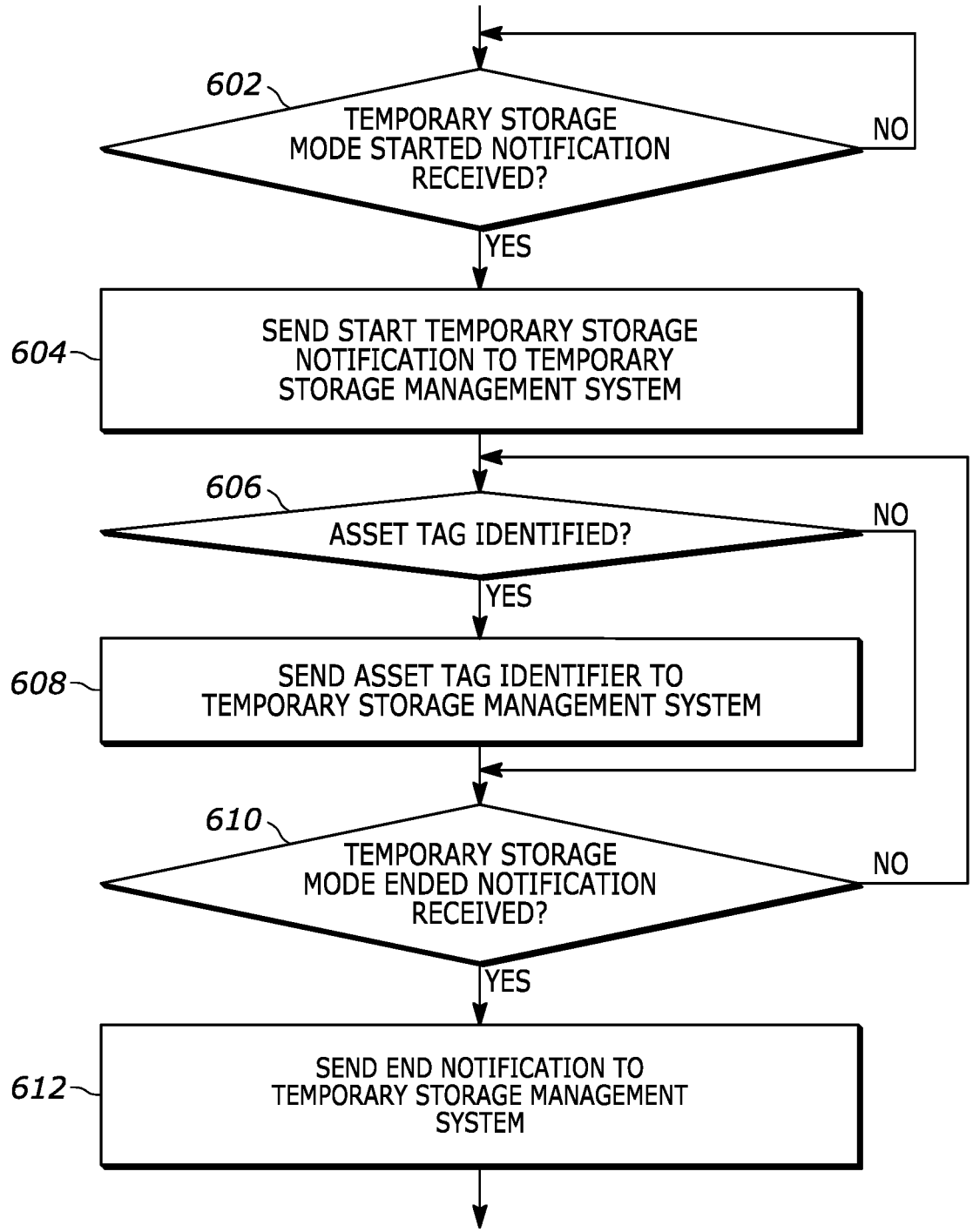
FIG. 6 is a flowchart representative of an example method, hardware logic or machine-readable instructions for implementing the example electronic device of FIG. 1.

FIG. 6 is a flowchart 600 representative of an example method, hardware logic or machine-readable instructions for implementing the user electronic device 134, in accordance with disclosed embodiments. The machine-readable instructions may be an executable program or portion of an executable program for execution by a computer processor such as the processor 802 shown in the processor platform 800 discussed below in connection with FIG. 8. The program may be embodied in software stored on a non-transitory computer-readable storage medium such as a CD, a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example program is described with reference to the flowchart 600 illustrated in FIG. 6, many other methods of implementing the he user electronic device 134 may alternatively be used. For example, the order of execution of the blocks may be changed, and/or some of the blocks described may be changed, eliminated, or combined. Additionally, and/or alternatively, any or all of the blocks may be implemented by one or more of a hardware circuit (e.g., discrete and/or integrated analog and/or digital circuitry), an FPGA, an ASIC, a PLD, an FPLD, a comparator, an operational-amplifier (op-amp), a logic circuit, etc.) structured to perform the corresponding operation without executing software or firmware.

The example flowchart 600 of FIG. 6 begins with the GUI 138 of the electronic device 134 waiting to receive a notification from a user that opportunistic, temporary storage of items, inbound or outbound, is to begin (block 602). That is, that items are going to be stored in opportunistic, temporary locations. When the notification is received (block 602), the electronic device 134 sends a notification to the temporary storage management system 102 that items will start to be stored in opportunistic, temporary storage locations (block 604).

As asset tags of items to be opportunistically, temporarily stored are identified (block 606), they are sent to the temporary storage management system 102 (block 608). When the GUI 138 of the electronic device 134 receives a notification from a user that opportunistic, temporary storage of items is to end (block 610), the electronic device 134 sends a notification to the temporary storage management system 102 that opportunistic, temporary storage of items is ending (block 612). That is, that items are no longer going to be stored in opportunistic, temporary locations. Control then exits from the example flowchart 600. Otherwise, control returns to block 606 to check for the identification of another asset tag. In some examples, the GUI 138 and/or, more generally, the electronic device 134 displays a reminder, notification, etc. that items were opportunistically, temporarily stored.

Returning to block 606, if an asset tag is not identified (block 606), control proceeds to block 610 to determine whether a notification from a user that opportunistic, temporary storage of items is to end was received (block 610).

Figure 7:
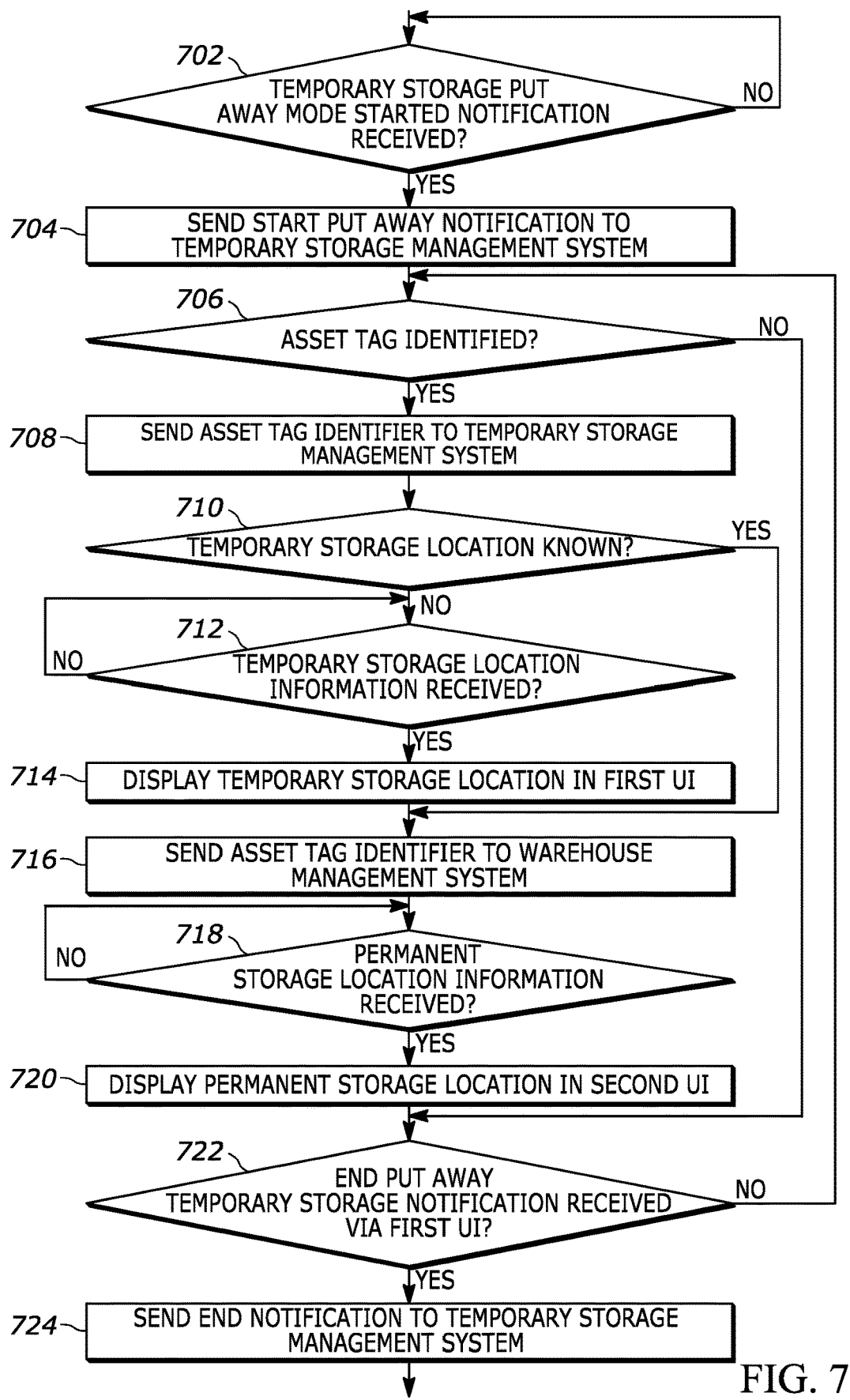
FIG. 7 is a flowchart representative of another example method, hardware logic or machine-readable instructions for implementing the example electronic device of FIG. 1.

FIG. 7 is a flowchart 700 representative of another example method, hardware logic or machine-readable instructions for implementing the user electronic device 134, in accordance with disclosed embodiments. The machine-readable instructions may be an executable program or portion of an executable program for execution by a computer processor such as the processor 802 shown in the processor platform 800 discussed below in connection with FIG. 8. The program may be embodied in software stored on a non-transitory computer-readable storage medium such as a CD, a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example program is described with reference to the flowchart 700 illustrated in FIG. 7, many other methods of implementing the he user electronic device 134 may alternatively be used. For example, the order of execution of the blocks may be changed, and/or some of the blocks described may be changed, eliminated, or combined. Additionally, and/or alternatively, any or all of the blocks may be implemented by one or more of a hardware circuit (e.g., discrete and/or integrated analog and/or digital circuitry), an FPGA, an ASIC, a PLD, an FPLD, a comparator, an operational-amplifier (op-amp), a logic circuit, etc.) structured to perform the corresponding operation without executing software or firmware.

The example flowchart 700 of FIG. 7 begins with the GUI 138 of the electronic device 134 waiting to receive a notification from a user that put away of opportunistic, temporary stored items, inbound or outbound, is to begin (block 702). That is, that items that are currently stored in one or more temporary locations are to be moved to their final location(s). When the notification is received (block 702), the electronic device 134 sends a notification to the temporary storage management system 102 to start put away mode (block 704).

As asset tags of items to be put away are identified (block 706), their identifiers are sent to the temporary storage management system 102 (block 708). If temporary location information is not known for an identified asset tag (block 710), the electronic device 134 waits for the temporary location information from the temporary storage management system 102 (block 712) and displays the received temporary location information in the GUI 138 (block 714).

The electronic device 134 sends the identifier of the identified asset to the WMS 128 (block 716), waits for final location information (block 718), and displays the received final location information in the GUI 136 (block 720).

When the GUI 138 of the electronic device 134 receives a notification from a user that opportunistic, temporary storage of items is to end (block 610), the electronic device 134 sends a notification to the temporary storage management system 102 that opportunistic, temporary storage of items is ending (block 612). That is, the moving of items that are currently stored in one or more temporary locations to their final location(s) is ended. Control then exits from the example flowchart 600. Otherwise, control returns to block 606 to check for the identification of another asset tag. In some examples, any reminder, notification, etc. that items were opportunistically, temporarily stored provided the GUI 138 and/or, more generally, the electronic device 134 is cleared once all opportunistically, temporarily stored items have been put away.

When the GUI 138 of the electronic device 134 receives a notification from a user that put away of opportunistically, temporarily stored items is to end (block 722), the electronic device 134 sends an end notification to the temporary storage management system 102 (block 724), and control exits from the example flowchart 600. Otherwise, control returns to block 706 to check for the identification of another asset tag.

Returning to block 710, if temporary location information is known for an identified asset tag (block 710), control proceeds to block 716 to send the asset tag identifier to the WMS 128 (block 716).

Returning to block 706, if an asset tag is not identified (block 706), control proceeds to block 722 to determine whether a notification from a user that put away mode is to end was received (block 722).

In some examples, the flowcharts 600 and 700 are carried out in response to a single user using the electronic device 134. In some examples, the flowcharts 600 and 700 are carried out in response to multiple users using one or more electronic devices 134.

Figure 8:
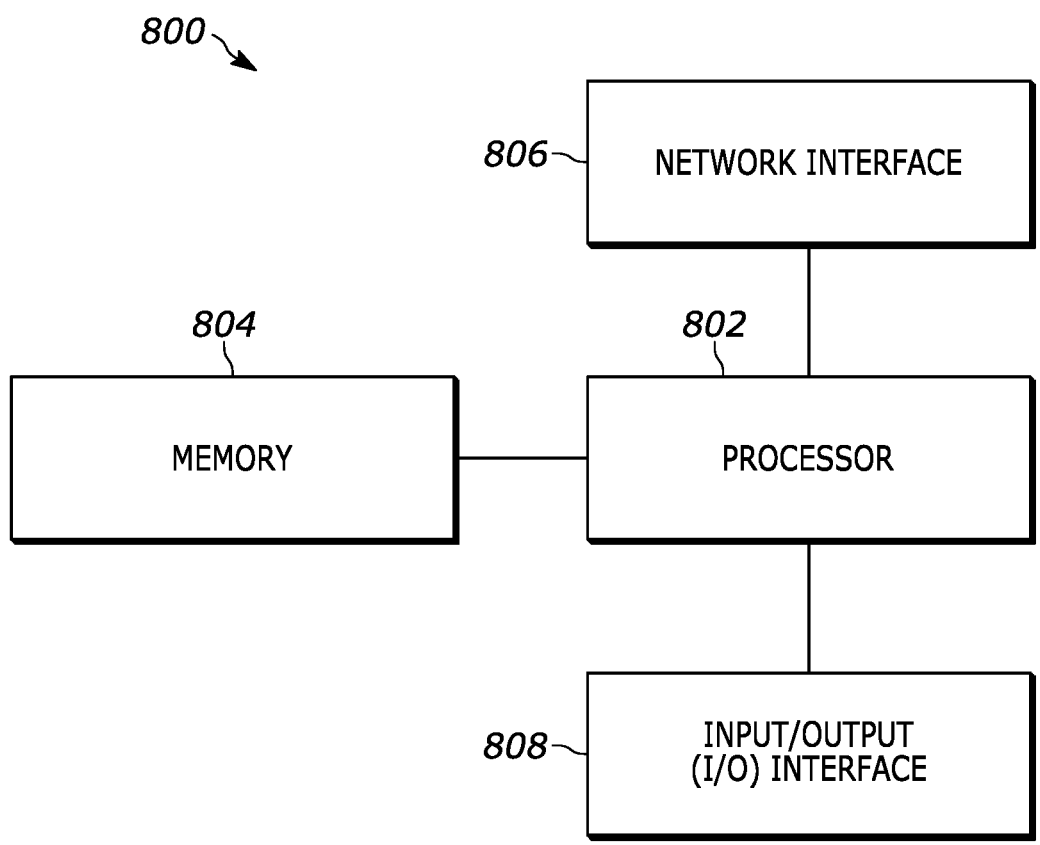
FIG. 8 is a block diagram of an example logic circuit for implementing example devices, systems, methods and/or operations described herein.

FIG. 8 is a block diagram representative of an example logic circuit capable of implementing, for example, one or more components of the example the temporary storage management system 102 and/or the user electronic device 134 of FIG. 1. The example logic circuit of FIG. 8 is a processing platform 800 capable of executing instructions to, for example, implement operations of the example use cases and/or methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 800 of FIG. 8 includes a processor 802 such as, for example, one or more microprocessors, controllers, and/or any suitable type of processor. The example processing platform 800 of FIG. 8 includes memory (e.g., volatile memory, non-volatile memory) 804 accessible by the processor 802 (e.g., via a memory controller). The example processor 802 interacts with the memory 804 to obtain, for example, machine-readable instructions stored in the memory 804 corresponding to, for example, an operating system and/or the operations represented by the flowcharts and/or use cases of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 800 to provide access to the machine-readable instructions stored thereon.

The processing platform 800 of FIG. 8 includes one or more communication interfaces such as, for example, a network interface 806 and/or an input/output (I/O) interface 808. The communication interface(s) enable the processing platform 800 of FIG. 8 to communicate with, for example, another device (e.g., the electronic device 134), system (e.g., the temporary storage management system 102, the location tracking system 116, and/or the WMS 128), host system, a datastore or database (e.g., one or both of the datastores 130, 132), or any other machine.

The network interface 806 enables communication with other machines via, for example, one or more networks. The example network interface 806 includes any suitable type of wired and/or wireless network interface(s) configured to operate in accordance with any suitable protocol(s) like, for example, a TCP/IP interface, a Wi-Fi™ transceiver (according to the IEEE 202.11 family of standards), an Ethernet transceiver, a cellular network radio, a satellite network radio, a coaxial cable modem, a digital subscriber line (DSL) modem, a dialup modem, or any other suitable communication protocols or standards.

The I/O interfaces 808 of FIG. 8 enable receipt of user input and communication of output data to the user. The I/O interfaces 808 may include any number and/or type(s) of different types of I/O circuits or components that enable the processor 802 to communicate with peripheral I/O devices. Example I/O interfaces 808 include a universal serial bus (USB) interface, a Bluetooth® interface, a near field communication (NFC) interface, an RFID interface, a serial interface, and/or an infrared transceiver. The peripheral I/O devices may be any desired type of I/O device such as a keyboard, a display (e.g., the display 140), a navigation device (e.g., a mouse, a trackball, a capacitive touch pad, a joystick, etc.), a speaker, a microphone, a printer, a button, etc.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, rearranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, rearranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for managing temporary storage in a warehouse having an electronic locationing system, the method comprising:
   receiving, at a temporary storage management system, a first electronic notification that an item of a shipment is to be stored in a temporary location in a warehouse;
   in response to the first electronic notification, automatically redirecting location information for an asset tag affixed to the item from a warehouse management system to the temporary storage management system as the item is moved to the temporary location, wherein the location information is determined electronically by an electronic locationing system based on the asset tag affixed to the item;
   receiving, at the temporary storage management system, a second electronic notification that the item is to be moved from the temporary location to a final location;
   in response to the second notification, automatically communicating, from the temporary storage management system to a warehouse worker, the temporary location of the item determined based on the location information for the asset tag to enable the warehouse worker to locate the item at the temporary location and to move the item to a final location, the final location identified for the warehouse worker by the warehouse management system; and
   ceasing the redirecting of the location information for the asset tag to the temporary storage management system,
   wherein the warehouse management system comprises a first application, and the temporary storage management system comprises a second application different from the first application, and
   wherein the first electronic notification is received from a first warehouse worker's electronic device, the second electronic notification is received from a second warehouse worker's electronic device, and the temporary location information is communicated to the second warehouse worker's electronic device.

2. The method of claim 1, wherein the first and second applications are not communicatively coupled.

3. The method of claim 1, wherein the ceasing the redirecting is in response to at least one of the second notification, a third notification, or the communicating the temporary location.

4. The method of claim 2, wherein the third notification indicates receipt of the communicated temporary location by the worker.

5. The method of claim 1, wherein the redirecting the location information includes instructing the electronic locationing system to redirect the location information from the warehouse management system to the temporary storage management system.

6. The method of claim 1, wherein the ceasing the redirecting the location information includes instructing the electronic locationing system to cease redirecting the location information to the temporary storage management system.

7. The method of claim 1, wherein the shipment is an inbound shipment, and the final location is a location in the warehouse.

8. The method of claim 1, wherein the shipment is an outbound shipment, and the final location is a location in a shipping vehicle.

9. The method of claim 1, wherein the temporary location is at least one of an opportunistic, available or random storage location in the warehouse.

10. The method of claim 1, wherein the asset tag includes a passive, ultra-high frequency (UHF), radio frequency identification (RFID) tag.

11. The method of claim 1, further comprising electronically determining, using an array of locationing devices, the location information based on the asset tag affixed to the item.

12. The method of claim 1, wherein the temporary location information is communicated to the warehouse worker via an electronic device, the electronic device used by the warehouse worker to interact with the warehouse management system to determine the final location.

13. A system for managing temporary storage in a warehouse having an electronic locationing system, the system comprising:
- an array of locationing devices configured to electronically determine location information for an item in a warehouse;
- a warehouse management system to direct the storage of the items at a managed location in the warehouse;
- one or more electronic devices configured to enable one or more warehouse workers to interact with the warehouse management system for storage of the item at the managed location in the warehouse; and
- a temporary storage management system configured to:
  - receive a first electronic notification from a first warehouse worker via a first electronic device that an item of a shipment is to be stored at a temporary location in the warehouse;
  - in response to the first notification, cause the electronic locationing system to automatically redirect location information for the item from the warehouse management system to the temporary storage management system;
  - receive a second electronic notification from a second warehouse worker via a second electronic device that the item is to be stored at a final location; and
  - in response to the second notification, automatically communicate the temporary location to the second warehouse worker via the second electronic device to enable the second warehouse worker to locate the item at the temporary location and move the item to a final location, the final location identified for the second warehouse worker by the warehouse management system via the second electronic device.

14. The system of claim 13, wherein the warehouse management system comprises a first application, and the temporary storage management system comprises a second application different from the first application.

15. The system of claim 13, wherein the shipment is an inbound shipment, and the final location is a location in the warehouse.

16. The system of claim 13, wherein the shipment is an outbound shipment, and the final location is a location in a shipping vehicle.

17. The system of claim 13, wherein the temporary location is at least one of an opportunistic, available or random storage location in the warehouse.

18. The system of claim 13, wherein the first warehouse worker is the second warehouse worker.

19. The system of claim 13, wherein the first electronic device is the second electronic device.

* * * * *